July 27, 1965  H. SINCLAIR ETAL  3,196,703
CHANGE SPEED GEARBOXES
Filed March 11, 1963  2 Sheets-Sheet 2

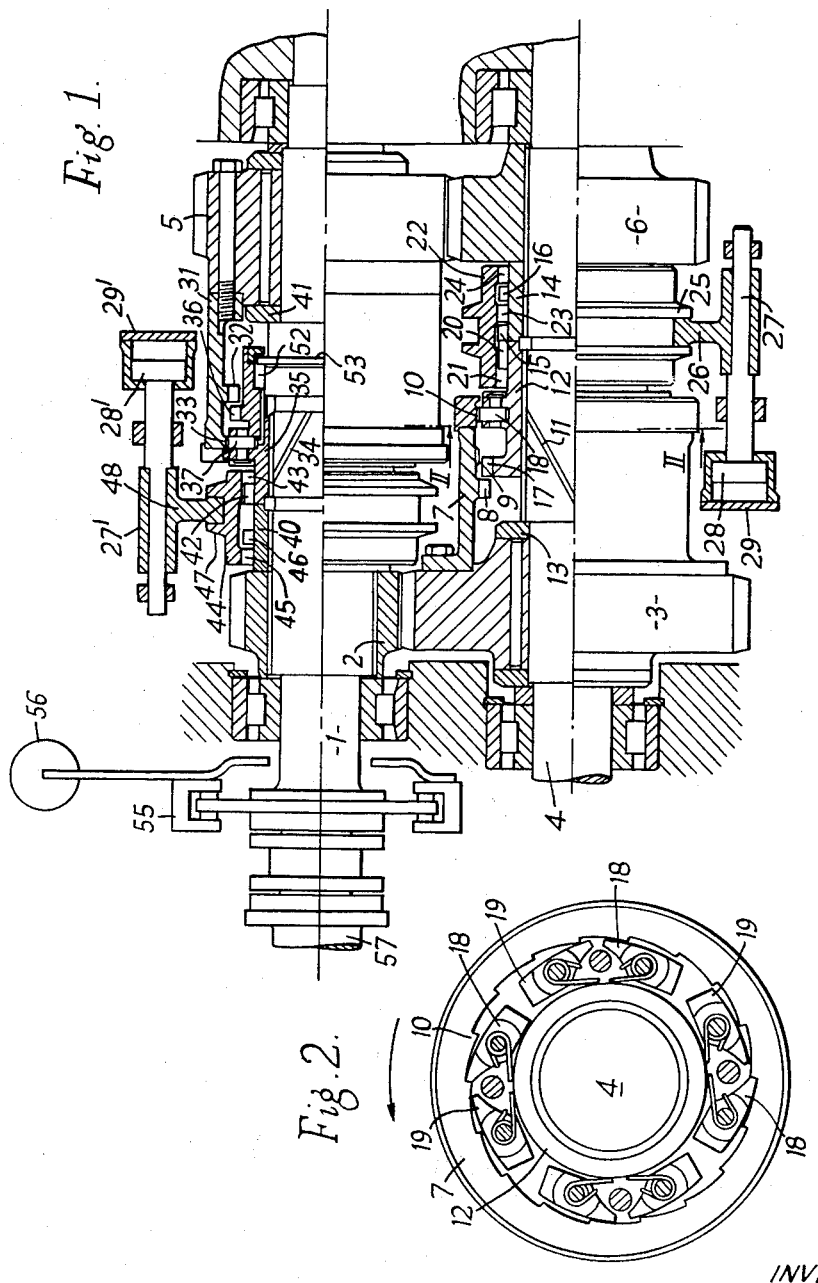

INVENTORS
HAROLD SINCLAIR
HERBERT ARTHUR CLEMENTS
BY
Benjamin Sweedler
ATTORNEY

United States Patent Office 3,196,703
Patented July 27, 1965

3,196,703
CHANGE SPEED GEARBOXES
Harold Sinclair, Kensington, London, and Herbert Arthur Clements, Weybridge, Surrey, England, assignors to S.S.S. Patents Limited, Surrey, England
Filed Mar. 11, 1963, Ser. No. 264,207
Claims priority, application Great Britain, May 21, 1962, 19,524/62
4 Claims. (Cl. 74—339)

This invention relates to multi-ratio change speed gearboxes of the type wherein at least first viz. low speed gear is established by the engagement of a synchronous self-shifting clutch.

The synchronous self-shifting clutch concerned is of the type comprising a first rotary clutch member with clutch teeth, a second rotary clutch member, an intermediate member with clutch teeth, movable helically relative to the second clutch member into and out of toothed engagement with the first clutch member, and means, e. g. pawls for initiating said toothed engagement when there is relative rotation in one direction between the said first and second clutch members.

Multi-ratio gearboxes of the type referred to have not hitherto been capable of giving a neutral condition in the gearbox itself, and this has limited their field of usage. In some cases such gearboxes have been employed in association with hydraulic turbo couplings between the prime mover and the gearbox, said couplings being of the controllable filling type, viz. of the type in which the degree of filling of the working circuit and hence the slip in the coupling is variable for example by means of an adjustable scoop. In such cases a neutral condition in the system is obtainable by substantially emptying the working circuits of the couplings, thus overcoming the problem that a neutral condition is not obtainable within such a change speed gearbox.

It has been proposed to use a hydraulic turbo torque converter between the prime mover and a gearbox of the type referred to, the torque converter being however of the type in which the degree of filling of the working circuit can be varied, and in which therefore a neutral condition of the transmission can be obtained by substantially emptying the said working circuit.

Hydraulic torque converters or converter-couplings or hydraulic turbo couplings of the constant filling type have not been used with gearboxes of the type referred to because a neutral condition of the transmission cannot be set up either in the converter or converter-coupling or turbo coupling or in the change speed gearbox. If it were desired to use a constant filling type torque converter or converter-coupling or turbo coupling then since the change speed gearbox itself is incapable of providing a neutral condition it would be necessary to provide an isolating friction clutch, e. g. between the prime mover and the converter or coupling or between the converter or coupling and the gearbox.

The object of the invention is to provide a change speed gearbox of the type referred to within which however a neutral setting can be established so that it is suitable for use with a constant filling type torque converter or converter-coupling or hydraulic turbo coupling, without an isolating friction clutch.

In accordance with the invention there is provided a change speed multi-ratio change speed gearbox, wherein the low speed gear is established by the engagement of a synchronous self-shifting clutch capable of assuming an over-running viz. non-driving condition and a driving condition, the clutch comprising a first rotary clutch member with clutch teeth, a second rotary clutch member, an intermediate member with clutch teeth, means constraining said intermediate member for limited helical movement relative to said second clutch member into and out of toothed engagement with said first clutch member, and means for initiating said toothed engagement when there is relative rotation in the driving direction between said first and second clutch members, the clutch having control means selectively operable to provide a further nondriving condition of the clutch when the input shaft is subjected to driving torque.

The clutch provided in the second speed gear train and any higher speed gear train of the gearbox may be of any suitable type, e. g. a friction clutch, but it is preferably a clutch of the synchronous self-shifting type. A clutch of the last-mentioned type is in fact employed in the second gear train of the two-speed gearbox incorporating the invention which will now be described by way of example, with reference to the accompanying drawings, in which:

FIG. 1 is a view on longitudinal section of a gearbox according to the invention, wherein the first speed clutch and also the second speed gear clutch are shown in the disengaged condition, to give the desired neutral condition of the gearbox.

FIG. 2 is a view showing the arrangement of the pawls of the first gear clutch of FIG. 1, as viewed from the left on section line II–II of FIG. 1.

Figure 3:
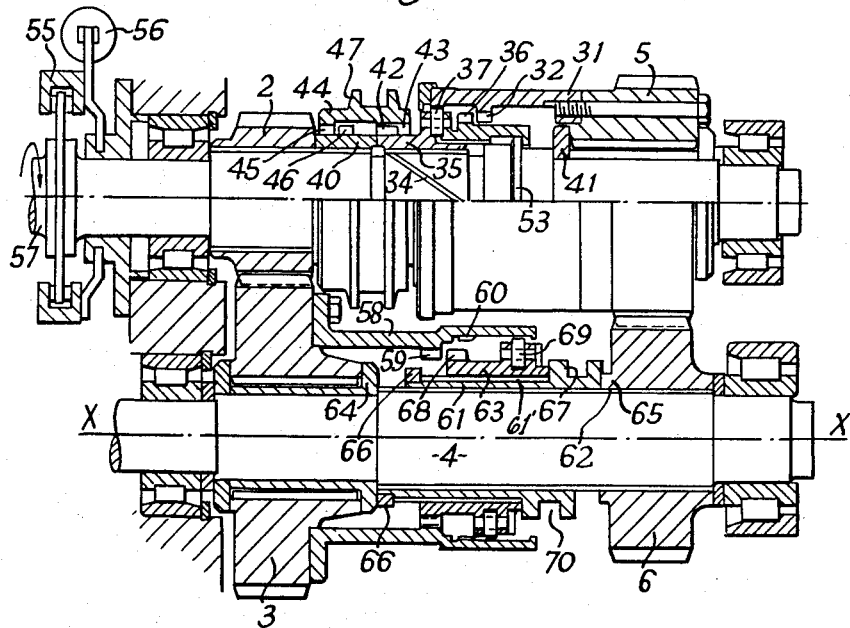
Figure 4:
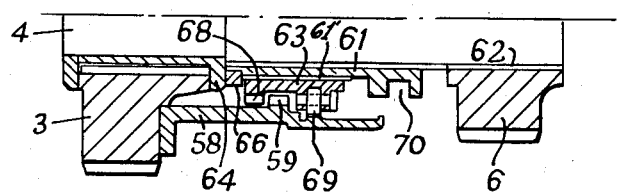

FIG. 3 is a view in longitudinal section of another gearbox according to the invention, with the second speed gear clutch disengaged, and showing, above and below the centre line of the first speed gear clutch respectively, the neutral non-driving condition and the engaged condition of the first speed gear clutch, and FIG. 4 is a part view showing the condition of the first gear clutch when it is over-running as is requisite when the second speed gear clutch is engaged.

Viewing the gearbox in side elevation, the input shaft 1, which is driven from the left hand end thereof, as seen in the drawing, carries a first speed pinion 2 engaged with a first speed gear wheel 3 carried by an output shaft 4, and the input shaft 1 also carries a second speed pinion 5 engaged with a second speed gear wheel 6 mounted on the output shaft 4. The first speed pinion 2 and the second speed gear wheel 6 are fixed on their respective shafts 1 and 4, whereas the first speed gear wheel 3 and the second speed pinion 5 are capable of being selectively clutched to and disengaged from their respective shafts 1 and 4 by means of synchronous self-shifting clutches to be described.

The clutch for connecting the first speed gear wheel 3 to and disconnecting it from the output shaft 4 comprises a ring 7 bolted to the gear wheel 3, the ring 7 having a ring of internal clutch teeth 8 and two rings of ratchet teeth 9 and 10, the teeth 9 and 10 being oppositely directed. The shaft 4 is formed with external helical left hand splines 11 with which are engaged internal helical splines in an intermediate member formed by a clutch sleeve 12 which is thereby capable of helical movement relative to the shaft 4 between axial stops 13 and 14 fixed on the shaft 4, the stop 14 being formed with two axially spaced rings of shaft dogs 15 and 16. The clutch sleeve 12 is provided with a ring of external clutch teeth 17, and carries pawls 18 and 19 mounted on pawl pins, the pawls 18 and 19 having their noses pointing in opposite directions and alternating in angular sense as shown by FIG. 2. The clutch sleeve 12 is also formed with a ring of external straight splines 20 with which are engaged internal straight splines 21 in a control sleeve 22 which also has two axially spaced rings of internal locking dogs 23 and 24, and a grooved flange 25 in which engages a control fork 26 actuated by the piston rod 27 of a servo motor comprising a piston 28 movable in a servo cylinder 29.

The clutch for connecting the second speed pinion 5 to and disconnecting it from the shaft 1 comprises a ring 31 bolted to the pinion 5, the ring 31 carrying a ring of internal clutch teeth 32 and a ring of internal ratchet teeth 33. The shaft 1 is formed with external left hand helical splines 34 with which are engaged internal helical splines in an intermediate member formed by a clutch sleeve 35 that carries a ring of external clutch teeth 36 and a ring of pawls 37 mounted on pawl pins. The clutch sleeve 35, which by virtue of the above-mentioned inter-engaged splines is movable helically relative to shaft 1 between axial stops 40 and 41, also has a ring of straight external splines 42 in which engage straight internal splines 43 in a control sleeve 44 which also has a ring of internal locking dogs 45 engageable with shaft dogs 46 on the stop 40, and also has a grooved flange 47 in the groove of which engages a control fork 48 actuated by servo motor 27'–29'. The clutch sleeve 35 is formed to provide an annular cavity 52 into which a flange 53 on shaft 4 projects. The cavity 52 and flange 53 form a dashpot, oil supplied to the cavity 52 being capable of escaping from the cavity only through the narrow clearance around the flange 53.

Back-turning brake means indicated generally at 55 and actuated by a fluid pressure servo motor 56 are provided in association with the input shaft 1, actuation of the back-turning brake means 55 causing the shaft 1 to be engaged and rotated backwards through an angle of say 30°.

In describing the operation of the mechanism shown in FIGS. 1 and 2 it will be assumed that the normal, viz. driving direction of the input shaft 1 is in the clockwise direction when the gearbox is viewed from the left hand side as shown in the arrow in FIG. 1. In the case in which the engine is a locomotive diesel engine, with a torque converter-coupling of the constant filling type between the engine and the gearbox, the output shaft of the torque converter-coupling being shown at 57, it will be assumed that with the locomotive stopped and the engine idling the input shaft 1 rotates slowly in the normal clockwise direction under the action of the drag torque of the converter-coupling. Under these conditions the parts of the gearbox have the positions shown in FIG. 1, with the ratchet teeth 10 ratchetting relative to the pawls 18 and the pawls 37 ratchetting relative to the ratchet teeth 33. This is the neutral condition of the gearbox in which no power is transmitted from the input shaft 1 to the output shaft 4.

In order to change from neutral to low speed gear, the servo motor 27–29 is actuated to urge the control sleeve 22 to the left, causing the locking dogs 23 and 24 to bear resiliently against the ends of the shaft dogs 15 and 16 respectively. The back-turning brake means 55 are then actuated, with the effect that the rotation of shaft 1 is arrested and the shaft is turned backwards through a limited angle, say 30°. This backward rotation of the shaft 1 causes pawls 37 to engage ratchet teeth 33, and the backward rotation of gear wheel 3 causes ratchet teeth 10 to engage pawls 18. The clutch sleeve 35 shifts helically to the right so as to bring its clutch teeth 36 into inter-engagement with the clutch teeth 32, this movement being damped by the dashpot 52, 53. The clutch sleeve 12 shifts helically to the left, its clutch teeth 17 passing through the clutch teeth 8 and the clutch sleeve continuing its movement to the left due to the co-action of the clutch teeth 17 and 8, until it comes near the stop 13, with the clutch teeth 17 clear of the clutch teeth 8 and the ratchet teeth 9 in ratchetting relationship with the pawls 19. This helical movement of the clutch sleeve 12 causes the control sleeve 22 to rotate, and when the clutch sleeve 12 has moved to the left just beyond the positon of full inter-engagement of the clutch teeth 17 and 8 the locking dogs 23 and 24 are able to slip past the ends of the shaft dogs 15 and 16 under the resilient pressure due to the servo motor 27–29, the axial movement of the control sleeve 22 being arrested when the dogs 23 and 24 are in lateral alignment with the dogs 15 and 16. Any further backward rotation of the input shaft will cause the clutch sleeve 12 to move further to the left, bringing the pawls 19 into ratchetting relationship with the ratchet teeth 9, and the dogs 23 and 24 are then spaced angularly with respect to the dogs 15 and 16.

The back-turning brake means 55 are then released, so that the input shaft 1 is rotated fractionally in the forward direction by the torque due to the converter-coupling, and the forward rotation of gear wheel 3 causes ratchet teeth 9 to engage pawls 19 and shift the clutch sleeve 12 to the right until the clutch teeth 17 are fully inter-engaged with the clutch teeth 8, the accompanying rotation of the control sleeve 22 bringing the locking dogs 23 and 24 into rotational driving engagement with the shaft dogs 15 and 16.

During the above-described forward rotation of the input shaft 1 the interaction of the clutch teeth 36 and 32 causes the clutch sleeve 35 to move helically to the left up to the stop 40, it being free to do so since the control sleeve 44 is still in the neutral position, and the pawls 37 resume their ratchetting relationship with ratchet teeth 33.

For changing from first speed to neutral, with the locomotive stopped and the engine idling the servo motor 27–29 is actuated to urge the control sleeve 22 to the right, and the back-turning brake means 55 are actuated to engage the input shaft 1 and turn it backwards to relieve the control sleeve 22 from load whereupon it is moved to the right by the resilient control means back to the position shown in FIG. 1, with its locking dogs 23 and 24 clear of the shaft dogs 15 and 16. As before, the clutch sleeve 35 moves to the right into toothed engagement. When the back-turning brake means are released and the input shaft rotates in the normal direction under the idling torque from the converter-coupling, both clutch sleeves 12 and 35 move to their disengaged positions, corresponding to the neutral condition of the gearbox.

In a modification (not shown) the pawls 18 are omitted and a ring of spring pressed plungers is provided for urging the clutch teeth 17 into light nuzzling end contact with the clutch teeth 8 when the gearbox is in the neutral condition, the clutch teeth 17 snapping into engagement with and passing through the clutch teeth 8 under the action of the springs when the input shaft 1 is stopped and rotated backwards by the back-turning brake means.

In the gearbox shown in FIGS. 3 and 4 the low speed gear clutch differs from the low speed gear clutch shown in FIGS. 1 and 2. Other parts are similar to those of FIGS. 1 and 2 and have been given the same reference numerals.

The low speed gear clutch comprises a sleeve 58 bolted to the first speed gear wheel 3, the ring 58 carrying a ring of internal clutch teeth 59 and a ring of internal ratchet teeth 60. The clutch also comprises an auxiliary sleeve 61 constituting the second clutch member, and formed with internal straight, viz. axial, splines engaged with external straight splines 62 on the shaft 4. An intermediate member or clutch sleeve 63 formed with left-hand internal helical splines is engaged with left-hand external helical splines 61' on the auxiliary sleeve 61. The auxiliary sleeve 61 is movable axially between stops 64 and 65 fixed relative to the shaft 4, and itself carries stops 66 and 67 that limit the helical movement of the clutch sleeve 63 relative to the auxiliary sleeve 61. The auxiliary sleeve 61 is also formed with a groove in which engages a servo-actuated fork similar to that shown in FIG. 1. The clutch sleeve 63 carries a ring of external clutch teeth 68 and a ring of pawls 69 which are all similarly directed.

In the neutral condition of the gearbox, with the second gear clutch disengaged as shown in the upper part of FIG. 3, th parts of the low speed gear clutch have the positions as shown above the centre line X—X, viz. the auxiliary sleeve 61 is in its right hand position up against the stop 65, and the clutch sleeve 63 is in its right hand position up against the stop 67. The clutch teeth 68 are clear of the clutch teeth 59 so that the low speed gear clutch is also disengaged, as is requisite in the neutral condition.

To establish drive in low speed gear with the engine idling, the servo operated brake means are applied to stop the input shaft system, and the auxiliary sleeve 61 is urged resiliently to the left by actuation of a fork engaged in the groove 70 (for example by a servo motor). The clutch sleeve 63 tends to move with the auxiliary sleeve, but since the ends of the clutch teeth 68 will normally abut against the ends of the clutch teeth 59 the auxiliary sleeve 61 will be unable to complete its travel to the left. To overcome this, the back-turning brake mechanism 55–56 is operated to rotate the shaft 1 backwards through a limited angular degree, whereupon the clutch teeth 68 will become aligned with inter-tooth spaces of the clutch teeth 59 and will inter-engage with the teeth 59, the auxiliary sleeve thereupon continuing its movement to the left until it is up against the stop 64. The clutch sleeve 63 is free to continue to move to the left in consequence of further backward turning motion of ring 58 and the interaction of the clutch teeth 59 and 68, but the backward rotation would not be sufficient to carry the sleeve 63 hard up against the stop 66.

The pawls 69 are then in ratchetting relationship with the ratchet teeth 60. The back-turning mechanism 55, 56 is then disengaged, and the drag torque acting on the input shaft 1 rotates it in the normal driving direction. This has the effect that pawls 69 engage ratchet teeth 60 and the clutch sleeve 63 is shifted helically to the right to the position in which it is up against the stop 67 on the auxiliary sleeve 61 and its clutch teeth 68 are in driving engagement with the clutch teeth 59, so that when the engine power is increased torque is transmitted through the converter-coupling to the gearbox in the low speed gear ratio (see the half section of the clutch below the centre line X—X).

During periods when either low speed or second gear is engaged the auxiliary sleeve 61 is in its left hand setting in which it is up against the stop 64. If low speed gear is engaged as above described the clutch sleeve 63 is in its right hand setting in which it is up against the stop 67. When second gear is engaged by the sequence of operations described above in connection with FIGS. 1 and 2, the clutch sleeve 63 is in its left hand setting relative to the auxiliary sleeve 61, in which it is adjacent the stop 66. In this setting the clutch teeth 68 of the clutch sleeve 63 are to the left of the clutch teeth 59 and the pawls 69 and ratchet teeth 59 ratchet relative to one another (see FIG. 4).

When the locomotive is being brought to rest by an application of the brakes, with the low speed gear selected but with the low speed gear clutch over-running and not yet engaged, the idling drag torque through the converter-coupling, acting on the input shaft 1, will cause ratchet teeth 59 of the low speed gear clutch to engage with pawls 69 and shift the clutch sleeve helically to the right up to the stop 67 on the auxiliary sleeve 61, thereby engaging low speed gear prior to the stopping of the locomotive. In order with the locomotive stationary to set the first low speed gear clutch to the further non-driving condition required to establish a neutral condition in the gearbox, the associated servo mechanism is actuated to urge the auxiliary sleeve 61 to the right on its straight splines, such movement being however prevented due to the loading of the straight splines resulting from the interaction of the clutch teeth 59 and 68 due to the drag torque. The back-turning brake mechanism 55, 60 is then operated to rotate the input shaft 1 backwards sufficiently to relieve the straight splines from load and enable the auxiliary sleeve 61 to move to the right up to the stop 65. The back-turning brake means is then disengaged by means (not shown) responsive to the movement of the auxiliary sleeve 61 to the right, and as the input shaft 1 begins to rotate again in a forward direction the interaction of the clutch teeth 59 and 68 causes the clutch sleeve 63 to move helically to the right until it is again up against its right hand stop 67, in which setting the clutch teeth 59 and 68 are disengaged and the pawls 69 are to the right of the ratchet teeth 60 so that the clutch is in the further non-driving condition, and the gearbox is in the desired neutral condition.

In a converse arrangement the clutch sleeve 63 may be movable helically directly on the shaft 4 which constitutes the second clutch member in the conventional manner and the clutch teeth 59 are then movable axially to establish a condition in which the clutch is bi-directionally free. The said clutch teeth 59 may for example be carried by a ring which is movable axially relative to the gear wheel 3, and is provided with an actuating fork with resilient link mechanism.

What we claim is:

1. A multi-ratio change speed gearbox comprising an input member, an output member, means operable to establish selectively a low speed gear path, and at least one higher speed gear path between said input and output members, the means for establishing said low speed gear path comprising a first rotary clutch member drivably connected to one of said input and output members, clutch teeth on said first clutch member, a second rotary clutch member drivably connected to the other of said input and output members, an intermediate member, clutch teeth on said intermediate member, helical splines interconnecting said intermediate member and said second clutch member whereby said intermediate member is constrained for helical movement relative to said second clutch member into toothed engagement with said first clutch member upon rotation of said input member in the driving direction relative to said output member, and out of said toothed engagement upon a back-turning movement of said input member in the non-driving direction relative to said output member, and adjustable stop means operable selectively to prevent movement of said intermediate member in the said direction for toothed engagement beyond a position of toothed engagement with said first clutch member, and to permit movement of said intermediate member in the said direction to the extent that its teeth pass through and beyond the teeth of said first clutch member, to permit rotation of said input member in the driving direction without driving said output member via said low speed gear path.

2. A multi-ratio change speed gearbox comprising an input member, an output member, means operable to establish selectively a low speed gear path, and at least one higher speed gear path between said input and output members, the means for establishing said low speed gear path comprising a first rotary clutch member drivably connected to one of said input and output members, clutch teeth on said first clutch member, a second rotary clutch member drivably connected to the other of said input and output members, an intermediate member, clutch teeth on said intermediate member, helical splines interconnecting said intermediate member and said second clutch member whereby said intermediate member is constrained for helical movement relative to said second clutch member into toothed engagement with said first clutch member upon rotation of said input member in the driving direction relative to said output member, and out of said toothed engagement upon a back-turning movement of said input member in the non-driving direction relative to said output member, and rotational stop means adjustable when said intermediate member is in toothed engagement with said first clutch member, to prevent movement of said intermediate member in the said direction for toothed engagement beyond a position of toothed engagement with said first clutch member, and adjustable alternatively to permit movement of said intermediate member in the said direction to the extent that its teeth pass through and beyond the teeth of said first clutch member, to permit rotation of said input member in the driving direction without driving said output member via said low speed gear path.

3. A multi-ratio change speed gearbox comprising an input member, an output member, means operable to establish selectively a low speed gear path, and at least one higher speed gear path between said input and output members, the means for establishing said low speed gear path comprising a first rotary clutch member drivably connected to one of said input and output members, clutch teeth on said first clutch member, a second rotary clutch member drivably connected to the other of said input and output members, an intermediate member, clutch teeth on said intermediate member, helical splines interconnecting said intermediate member and said second clutch member whereby said intermediate member is constrained for helical movement relative to said second clutch member into toothed engagement with said first clutch member upon rotation of said input member in the driving direction relative to said output member, and out of said toothed engagement upon a back-turning movement of said input member in the non-driving direction relative to said output member, axial stop means carried by said second clutch member for limiting the movement of said intermediate member in the said direction for engagement, and means mounting said second clutch member for axial adjustment relative to said first clutch member selectively to a position in which said stop means prevent said intermediate member from moving in the said engaging direction beyond a position of toothed engagement with said first clutch member, and to a position in which movement of said intermediate member in the said direction is permitted to extend that its teeth pass through and beyond the teeth of said first clutch member, to permit rotation of said input member in the driving direction without driving said output member via said low speed gear path.

4. A multi-ratio change speed gearbox comprising an input member, an output member, means operable to establish selectively a low speed gear path, and at least one higher speed gear path between said input and output members, the means for establishing said low speed gear path comprising a first rotary clutch member drivably connected to one of said input and output members, clutch teeth on said first clutch member, a second rotary clutch member drivably connected to the other of said input and output members, an intermediate member, clutch teeth on said intermediate member, helical splines interconnecting said intermediate member and said second clutch member whereby said intermediate member is constrained for helical movement relative to said second clutch member into toothed engagement with said first clutch member upon rotation of said input member in the driving direction relative to said output member, and out of said toothed engagement upon a back-turning movement of said input member in the non-driving direction relative to said output member, stop means for preventing movement of said intermediate member in the engaging direction beyond a predetermined position, and means mounting the teeth of said first clutch member for selective adjustment to a position in which they are interengaged with the teeth of said intermediate member when the intermediate member is in said predetermined position, and to a position in which the said teeth are axially free of the teeth of said intermediate member with the intermediate member in the said predetermined position, whereby to permit rotation of said input member in the driving direction without driving said output member via said low speed gear path.

References Cited by the Examiner
UNITED STATES PATENTS 1,862,188   6/32   Legge.
2,770,979   11/56  Sinclair.

FOREIGN PATENTS 790,702   2/58   Great Britain.

DAVID J. WILLIAMOWSKY, *Primary Examiner.*